United States Patent
Hong (10) Patent No.: US 12,082,054 B2
(45) Date of Patent: Sep. 3, 2024

(54) INFORMATION PROCESSING METHOD AND APPARATUS, AND COMPUTER STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 353 days.

(21) Appl. No.: 17/626,812

(22) PCT Filed: Jul. 16, 2019

(86) PCT No.: PCT/CN2019/096238
§ 371 (c)(1),
(2) Date: Jan. 12, 2022

(87) PCT Pub. No.: WO2021/007789
PCT Pub. Date: Jan. 21, 2021

(65) Prior Publication Data
US 2022/0264385 A1   Aug. 18, 2022

(51) Int. Cl.
*H04W 36/00* (2009.01)
*H04W 36/08* (2009.01)

(52) U.S. Cl.
CPC . *H04W 36/0058* (2018.08); *H04W 36/00837* (2018.08); *H04W 36/08* (2013.01)

(58) Field of Classification Search
CPC ........... H04W 36/08; H04W 36/00837; H04W 36/0058
USPC ........................................................ 370/331
See application file for complete search history.

(56) References Cited

U.S. PATENT DOCUMENTS

| | | | | |
|---|---|---|---|---|
| 9,271,214 | B1* | 2/2016 | Yang | ............... H04W 48/20 |
| 2015/0334553 | A1* | 11/2015 | Yang | ............... H04W 36/0088 455/552.1 |
| 2015/0350934 | A1* | 12/2015 | Yang | ............... H04W 56/0045 370/252 |

(Continued)

FOREIGN PATENT DOCUMENTS

| CN | 101198136 A | 6/2008 |
|---|---|---|
| CN | 102036350 A | 4/2011 |

(Continued)

OTHER PUBLICATIONS

International Search Report of PCT/CN2019/096238 dated Apr. 7, 2020 with English translation, (4p).

(Continued)

*Primary Examiner* — Peter G Solinsky
(74) *Attorney, Agent, or Firm* — Arch & Lake LLP (57) ABSTRACT

An information processing method is provided. The method includes: configuring, for a user equipment (UE), measurement indication information used for cell reselection, where the UE has at least two identity recognition modules; and sending the measurement indication information to the UE, where the measurement indication information includes: first measurement indication information; and the first measurement indication information is used for indicating that the UE uses, when meeting a first condition, one identity recognition module from among the at least two identity recognition modules to perform cell reselection measurement.

16 Claims, 4 Drawing Sheets

(56) References Cited

U.S. PATENT DOCUMENTS

| | | | | |
|---|---|---|---|---|
| 2017/0048773 | A1* | 2/2017 | Miao | H04B 1/3816 |
| 2017/0094568 | A1* | 3/2017 | Yang | H04W 36/14 |
| 2017/0289958 | A1* | 10/2017 | Dev | H04W 60/00 |
| 2018/0063735 | A1* | 3/2018 | Raghunathan | H04W 24/08 |

FOREIGN PATENT DOCUMENTS

| | | |
|---|---|---|
| CN | 102264121 A | 11/2011 |
| CN | 102421088 A | 4/2012 |
| CN | 102421130 A | 4/2012 |
| CN | 102685833 A | 9/2012 |
| CN | 102958133 A | 3/2013 |
| CN | 103179623 A | 6/2013 |
| CN | 105517076 A | 4/2016 |
| CN | 105682077 A | 6/2016 |
| CN | 106211242 A | 12/2016 |
| CN | 106604332 A | 4/2017 |
| CN | 107071760 A | 8/2017 |
| CN | 107529155 A | 12/2017 |
| CN | 107889050 A | 4/2018 |
| CN | 108282317 A | 7/2018 |
| CN | 108521857 A | 9/2018 |
| CN | 109644379 A | 4/2019 |
| CN | 109787730 A | 5/2019 |
| CN | 109891819 A | 6/2019 |
| EP | 2302971 A2 | 3/2011 |
| KR | 20130119123 A | 10/2013 |
| WO | 2012109830 A1 | 8/2012 |

OTHER PUBLICATIONS

First Office Action to Chinese Patent Application No. 201980001438.2 dated Mar. 26, 2021 with English translation, (21p).

Chinese Notice of Allowance issued to Chinese Patent Application No. 201980001438.2 dated Nov. 12, 2021 with English translation, (8p).

* cited by examiner

INFORMATION PROCESSING METHOD AND APPARATUS, AND COMPUTER STORAGE MEDIUM

CROSS-REFERENCE TO RELATED APPLICATION

This application is a national stage application of International Application No. PCT/CN2019/096238 filed on Jul. 16, 2019, the disclosure of which is hereby incorporated by reference in its entirety for all purposes.

TECHNICAL FIELD

The present disclosure relates to communication technology, and in particular, to an information processing method, apparatus and computer storage medium.

BACKGROUND

In related art, the communication network regards different identification cards as different terminals. In addition, multiple identification cards of a multi-card terminal independently perform cell reselection.

SUMMARY

The present disclosure provides an information processing method, apparatus and computer storage medium.

According to a first aspect of the embodiments of the present disclosure, there is provided an information processing method, including:
  configuring measurement instruction information for cell reselection for a user equipment (UE); where the UE has at least two identity recognition modules; and
  sending the measurement instruction information to the UE;
  where the measurement instruction information includes:
  first measurement instruction information, and the first measurement instruction information is configured to instruct the UE to use one of the at least two identity recognition modules to perform cell reselection measurement in response to determining that a first condition is satisfied.

According to a second aspect of the embodiments of the present disclosure, there is provided an information processing method, which is applied to a UE with at least two identity recognition modules, including:
  receiving measurement instruction information for cell reselection configured by a base station for the UE; where the measurement instruction information includes first measurement instruction information, and the first measurement instruction information is configured to instruct the UE to use one of the at least two identity recognition modules to perform cell reselection measurement in response to determining that a first condition is satisfied; and
  performing cell reselection measurement according to the measurement instruction information.

According to a third aspect of the embodiments of the present disclosure, there is provided an information processing apparatus, including:
  a processor; and
  a memory for storing instructions executable by the processor;
  where the processor is configured to implement any one of the foregoing information processing methods applied to the base station side technical solution by executing the executable instructions.

According to a fourth aspect of the embodiments of the present disclosure, there is provided an information processing apparatus, including:
  a processor; and
  a memory for storing instructions executable by the processor;
  where the processor is configured to implement any one of the foregoing information processing methods applied to the UE-side technical solution by executing the executable instructions.

According to a fifth aspect of the embodiments of the present disclosure, there is provided a computer storage medium, the computer storage medium stores executable instructions, and after the executable instructions are executed by a processor, any one of the aforementioned information processing methods applied to the base station-side technical solution can be implemented.

According to a sixth aspect of the embodiments of the present disclosure, there is provided a computer storage medium, the computer storage medium stores executable instructions, and after the executable instructions are executed by a processor, any one of the aforementioned information processing method applied to the UE-side technical solution can be implemented.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The terms used in the embodiments of the present disclosure are only for the purpose of describing specific embodiments, and are not intended to limit the embodiments of the present disclosure. The singular forms of "a", "an" and "the" used in the embodiments of the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used to describe various information in the embodiments of the present disclosure, the information should not be limited to these terms. These terms are only used to distinguish the same type of information from each other. For example, without departing from the scope of the embodiments of the present disclosure, the first information may also be referred to as second information, and similarly, the second information may also be referred to as first information. Depending on the context, the words "if" and "in case" as used herein can be interpreted as "when" or "while" or "in response to determination that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
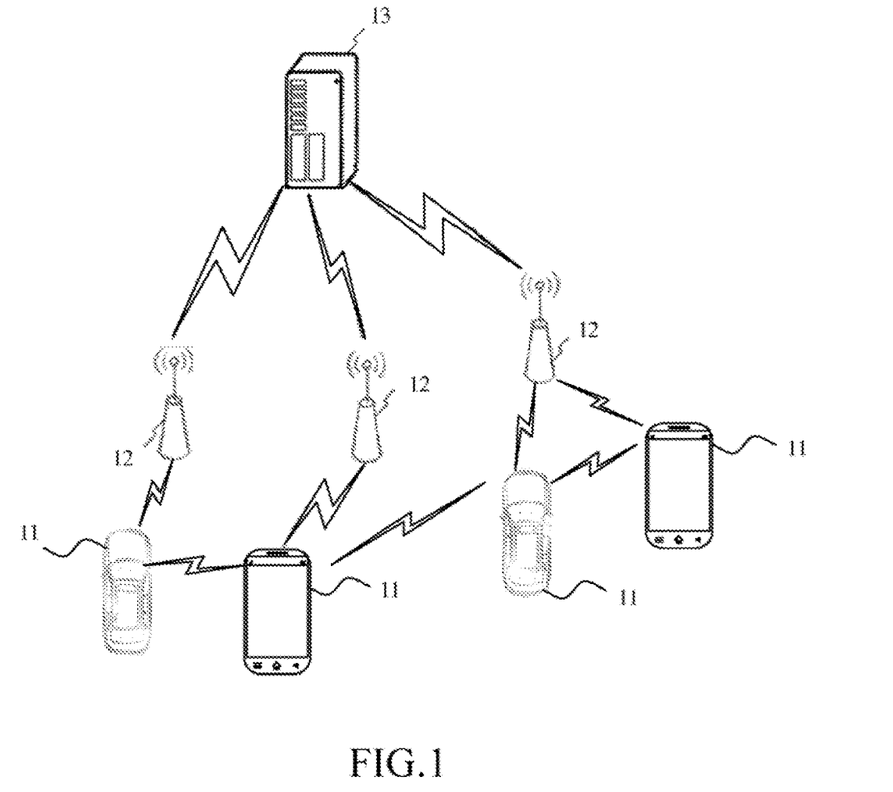
FIG. 1 is a schematic structural diagram illustrating a wireless communication system according to an embodiment.

FIG. 1 illustrates a schematic structural diagram of a wireless communication system provided by an embodiment of the present disclosure. As shown in FIG. 1, the wireless communication system is a communication system based on cellular mobile communication technology. The wireless communication system may include several terminals 11 and several base stations 12.

The terminal 11 may refer to a device that provides voice and/or data connectivity to the user. The terminal 11 may communicate with one or more core networks via a Radio Access Network (RAN). The terminal 11 may be an Internet of Things terminal, such as a sensor device and a mobile phone (or called a "cellular" phone), and may be a computer having an Internet of Things terminal, such as a fixed, portable, pocket-sized, handheld, computer built-in or vehicle-mounted apparatus. For example, it may be a Station (STA), a subscriber unit, a subscriber station, a mobile station, a mobile, a remote station, an access point, a remote terminal, an access terminal, a user apparatus (user terminal), a user agent, a user device, or a User Equipment (UE). Alternatively, the terminal 11 may also be a device of an unmanned aerial vehicle. Alternatively, the terminal 11 may also be an in-vehicle device, for example, it may be a trip computer with a wireless communication function, or a wireless communication device externally connected to the trip computer. Alternatively, the terminal 11 may also be a roadside device, for example, it may be a street lamp, a signal lamp, or other roadside device with a wireless communication function.

The base station 12 may be a network side device in a wireless communication system. The wireless communication system may be the $4^{th}$ generation mobile communication (4G) system, also known as the Long Term Evolution (LTE) system; or, the wireless communication system may also be a 5G system, also known as New Radio (NR) system or 5G NR system. Alternatively, the wireless communication system may also be the next-generation system of the 5G system. Among them, the access network in the 5G system may be called a New Generation-Radio Access Network (NG-RAN), or a Machine-Type Communication (MTC) system.

The base station 12 may be an evolved base station (eNB) used in the 4G system. Alternatively, the base station 12 may also be a base station (gNB) adopting a centralized and distributed architecture in the 5G system. When the base station 12 adopts the centralized and distributed architecture, it usually includes a Central Unit (CU) and at least two Distributed Units (DU). The central unit is provided with protocol stacks of a Packet Data Convergence Protocol (PDCP) layer, a radio link layer control protocol (Radio Link Control, RLC) layer, and a Media Access Control (MAC) layer. The distributed unit is provided with a Physical (PHY) layer protocol stack. The embodiments of the present disclosure do not limit the specific implementation manner of the base station 12.

A wireless connection may be established between the base station 12 and the terminal 11 through a wireless air interface. In different embodiments, the wireless air interface is a wireless air interface based on the $4^{th}$ generation mobile communication network technology (4G) standard; or, the wireless air interface is a wireless air interface based on the $5^{th}$ generation mobile communication network technology (5G) standard, for example, the wireless air interface is a new air interface; or, the wireless air interface may also be a wireless air interface based on a 5G-based next-generation mobile communication network technology standard.

In some embodiments, an End to End (E2E) connection may also be established between the terminals 11, such as Vehicle to Vehicle (V2V) communication, Vehicle to Infrastructure (V2I) communication and Vehicle to Pedestrian (V2P) communication in Vehicle to Everything (V2X) communication and other scenes.

In some embodiments, the above-mentioned wireless communication system may further include a network management device 13.

Several base stations 12 are connected to the network management device 13 respectively. The network management device 13 may be a core network device in a wireless communication system. For example, the network management device 13 may be a Mobility Management Entity (MME) in an Evolved Packet Core (EPC). Alternatively, the network management device may also be other core network devices, such as a Serving Gate Way (SGW), a Public Data Network Gate Way (PGW), a Policy and Charging Rules Function (PCRF) or home subscriber network side equipment (Home Subscriber Server, HSS), etc. The implementation form of the network management device 13 is not limited in the embodiments of the present disclosure.

Based on the above-mentioned wireless communication system, how to reduce the power consumption of the multi-card terminal caused by the cell reselection measurement, various embodiments of the method of the present disclosure are proposed.

Figure 2:
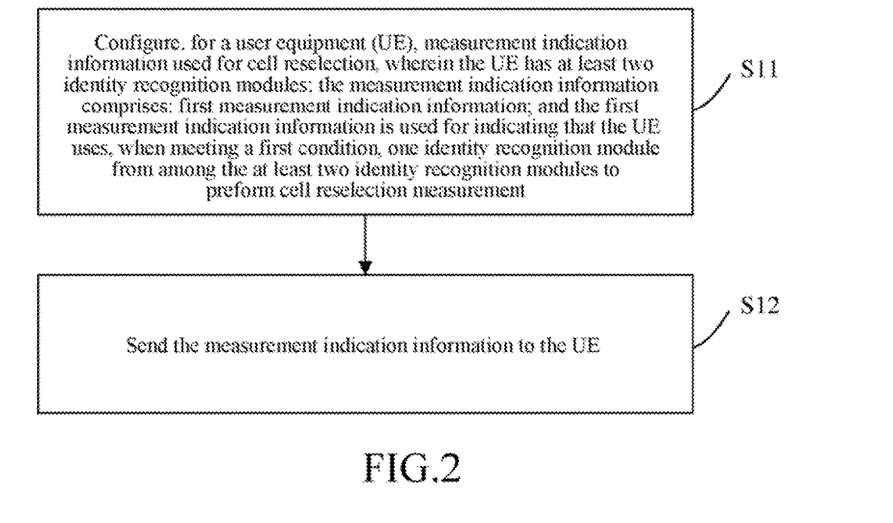
FIG. 2 is a first flow chart illustrating an information processing method according to an embodiment.

FIG. 2 is a first flowchart of an information processing method according to an embodiment. As shown in FIG. 2, the information processing method is used in a base station and includes the following steps.

In step S11, the user terminal (user equipment, UE) is configured with measurement instruction information for cell reselection; where the UE has at least two identity recognition modules; where the measurement instruction information includes: first measurement instruction information, and the first measurement instruction information is configured to instruct the UE to use one of the at least two identity recognition modules to perform cell reselection measurement when a first condition is satisfied.

For example, the user identity recognition module may be a Subscriber Identity recognition module (SIM) card, a User Identity Module (UIM) card, etc., and the user identity recognition module carries network access authentication information and the like.

In the embodiments of the present disclosure, the first identity recognition module and the second identity recognition module are two independent identity recognition modules.

For example, the first identity recognition module is the SIM card 1 and the second identity recognition module is the SIM card 2.

For example, the first identity recognition module is a UIM card 1, and the second identity recognition module is a UIM card 2.

The communication network corresponding to the first identity recognition module and the communication network corresponding to the second identity recognition module belong to the same operator network.

It should be noted that the communication network may be 2G, 3G, 4G, 5G, etc.

It should be noted that the present disclosure does not limit the trigger mode of configuring the measurement instruction information for cell reselection by the base station.

In some optional implementation manners, the first condition includes:
reference signal receiving power (RSRP) measurement values of N or more of the at least two identity recognition modules are higher than a first threshold, where N is a positive integer greater than or equal to 1.

The RSRP is a key parameter capable of representing the wireless signal strength, and one of physical layer measurement requirements in the LTE network.

N may be set according to a communication quality requirement, and the first threshold value may be set or adjusted according to the communication quality requirement.

For example, the UE has three identity recognition modules, and the first condition is that the RSRP measurement values of two or more of the three identity recognition modules are higher than the first threshold.

For example, the UE has three identity recognition modules, and the first condition is that the RSRP measurement value of each of the three identity recognition modules is higher than the first threshold value.

In some optional implementation manners, the first measurement instruction information includes:
instructing the UE to use the identity recognition module with the highest reference signal receiving power measurement value among its identity recognition modules to perform cell reselection measurement when the first condition is satisfied.

In this way, the base station sets that when the first condition is satisfied, the UE can select one identity recognition module to perform cell reselection measurement, and other identity recognition module(s) perform cell reselection based on the measurement result of the selected identity recognition module. Compared with the individual identity recognition modules performing cell reselection measurements separately, it saves the cell reselection measurement steps of other identity recognition module(s) in the multi-card terminal, thereby reducing the power consumption in the multi-card terminal due to the cell reselection measurement.

In some optional implementation manners, the measurement instruction information further includes:
second measurement instruction information;
where the second measurement instruction information is configured to instruct the UE that when the first condition is not satisfied or a second condition is satisfied, each identity recognition module in the UE performs cell reselection measurement separately.

In some optional embodiments, the second condition includes:
the RSRP measurement values of M or more identity recognition modules in the at least two identity recognition modules are lower than a second threshold, where M is a positive integer greater than or equal to 1.

M may be set according to the communication quality requirement, and the second threshold value may be set or adjusted according to the communication quality requirement.

For example, the UE has three identity recognition modules, and the second condition is that the RSRP measurement values of two or more of the three identity recognition modules are lower than the second threshold.

For example, the UE has three identity recognition modules, and the second condition is that the RSRP measurement value of each of the three identity recognition modules is lower than the second threshold value.

In this way, the base station sets the UE that when the first condition is not satisfied or the second condition is satisfied, each identity recognition module of the UE independently performs cell reselection measurement, so that each identity recognition module in the UE finds the serving cell with the best signal.

In step S12, the measurement instruction information is sent to the UE.

In this way, the UE is allowed to perform cell reselection measurement based on the measurement instruction information.

For example, the UE includes a first SIM card and a second SIM card. The first SIM card and the second SIM card belong to the same operator. When the base station discovers the UE, it configures measurement instruction information for cell reselection for the UE. When the RSRP measurement values of the first SIM card and the second SIM card are both higher than the first threshold value, the UE uses one of the SIM cards to perform cell reselection measurement, and the other SIM card does not need to perform cell reselection measurement, but performs cell reselection based on the measurement result of the cell reselection of other SIM card. In this way, compared to the cell reselection measurement performed by the first SIM card and the second SIM card separately, only a single SIM card is selected to perform cell reselection measurement, and the other SIM card performs cell reselection based on the cell reselection measurement result of the selected SIM card, which saves the power consumed by the multi-SIM card terminal due to the cell reselection measurement. When the UE does not satisfy that the RSRP measurement values of the first SIM card and the second SIM card are both higher than the first threshold, or satisfy that the RSRP measurement values of the first SIM card and the second SIM card are both lower than the second threshold, the first SIM card and the second SIM card independently perform cell reselection measurements to find the serving cell with the best signal for the first SIM card and the second SIM card.

In other words, the multi-card UE can perform different cell reselection measurements according to different actual situations, so as to find the best serving cell for each SIM card in the multi-card UE while saving power for the multi-card UE.

The technical solutions described in the embodiments of the present disclosure provide the multi-card UE with a cell reselection measurement method. By sending cell reselection measurement instruction information to the UE, the UE is notified to perform different cell reselection measurements according to the actual situation, the power consumption of the multi-card UE due to cell reselection measurement is reduced.

Figure 3:
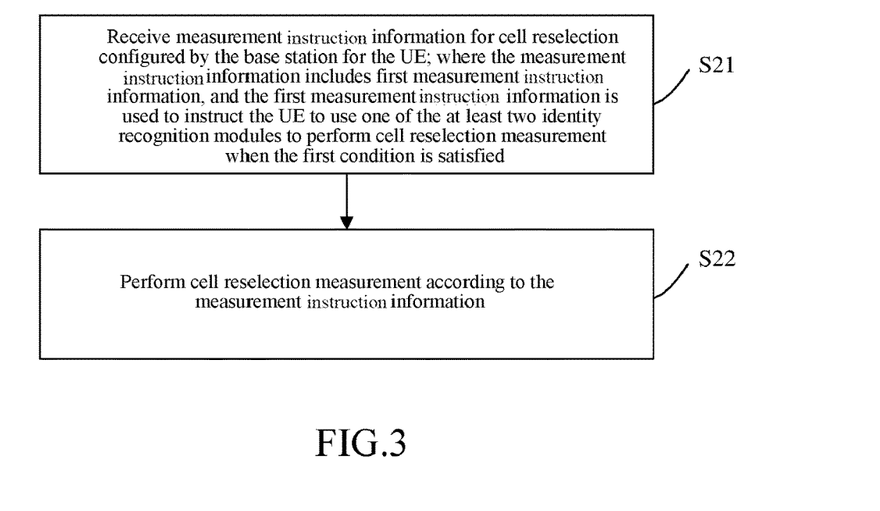
FIG. 3 is a second flowchart of an information processing method according to an embodiment.

FIG. 3 is a second flowchart of an information processing method according to an embodiment. As shown in FIG. 3, the information processing method is used in a user equipment (UE) with at least two identity recognition modules, and includes the following steps.

In step S21, measurement instruction information for cell reselection configured by the base station for the UE is received; where the measurement instruction information includes first measurement instruction information, and the first measurement instruction information is configured to instruct the UE to use one of the at least two identity recognition modules to perform cell reselection measurement when the first condition is satisfied.

In step S22, cell reselection measurement is performed according to the measurement instruction information.

In this way, the UE is allowed to perform cell reselection measurement based on the measurement instruction information.

The measurement instruction information includes first measurement instruction information and/or second measurement instruction information.

In some optional implementation manners, the first measurement instruction information is configured to instruct the UE to use one identity recognition module to perform cell reselection measurement when the first condition is met.

In some optional implementation manners, the second measurement instruction information is configured to instruct the UE that when the first condition is not satisfied or the second condition is satisfied, each identity recognition module in the UE performs cell reselection measurement separately.

In some optional implementation manners, performing cell reselection measurement according to the measurement instruction information includes:
when the UE satisfies the first condition, using one of the at least two identity recognition modules to perform cell reselection measurement.

In this way, compared to performing the cell reselection measurement by each identity recognition module individually, only one identity recognition module is selected for cell measurement, which saves the power consumed by other identity recognition module(s) of the multi-card terminal due to the cell reselection measurement.

In some optional implementation manners, the first condition includes:
reference signal receiving power measurement values of N or more of the at least two identity recognition modules are higher than the first threshold, where N is a positive integer greater than or equal to 1.

In some optional implementation manners, the first condition includes:
the reference signal receiving power measurement value of each of the at least two identity recognition modules is higher than the first threshold value.

In some optional implementation manners, using one of the at least two identity recognition modules to perform cell reselection measurement includes:
determining the identity recognition module with the highest reference signal receiving power measurement value among the at least two identity recognition modules; and
using the identity recognition module with the highest reference signal receiving power measurement value to perform cell reselection measurement.

Further, the method also includes:
performing cell reselection by other identity recognition module(s) based on the cell reselection measurement result of the selected identity recognition module.

In this way, since other identity recognition module(s) does not need to perform cell reselection measurement in this scenario, the power consumed by other identity recognition module(s) for cell reselection measurement can be saved.

In some optional implementation manners, performing cell reselection measurement according to the measurement instruction information includes:
when the UE does not satisfy the first condition or satisfies the second condition, controlling each identity recognition module to independently perform cell reselection measurement.

In this way, when the first condition is not satisfied or the second condition is satisfied, each identity recognition module independently performs cell reselection measurement, so that each identity recognition module finds the serving cell with the best signal.

In some optional embodiments, the second condition includes:
reference signal receiving power measurement value of each of the at least two identity recognition modules is lower than the second threshold value.

In this way, when the measurement result value of each identity recognition module is lower than the second threshold, the multi-card UE may be in an edge area of the cell, and each identity recognition module performs cell reselection measurement independently, so that each identity recognition module finds the service cell with the best signal.

For example, the UE includes a first SIM card and a second SIM card. The first SIM card and the second SIM card belong to the same operator. The UE receives the instruction information of the cell reselection measurement configured by the base station for the UE. When the RSRP measurement values of the first SIM card and the second SIM card are both higher than the first threshold value, one of the SIM cards is used to perform cell reselection measurement, and the other SIM card does not need to perform cell reselection measurement, but performs cell reselection based on the measurement result of the cell reselection of the selected SIM card. In this way, compared with the measurement of cell reselection performed by the first SIM card and the second SIM card independently, only a single SIM card is selected for cell measurement, which saves the power consumed by the multi-SIM terminal due to the measurement of cell reselection. When the UE does not satisfy that the RSRP measurement values of the first SIM card and the second SIM card are both higher than the first threshold, or satisfies that the RSRP measurement values of the first SIM card and the second SIM card are both lower than the second threshold, the first SIM card and the second SIM card independently perform cell reselection measurements to find the serving cell with the best signal for the first SIM card and the second SIM card.

In other words, the multi-SIM-card UE can perform different cell reselection measurements according to different actual situations, so as to find the best serving cell for each SIM card in the multi-SIM-card UE while saving power.

The technical solutions described in the embodiments of the present disclosure enable the UE to perform different cell reselection measurements according to different actual conditions, and reduce the power consumption of the multi-card UE due to the cell reselection measurement.

Figure 4:
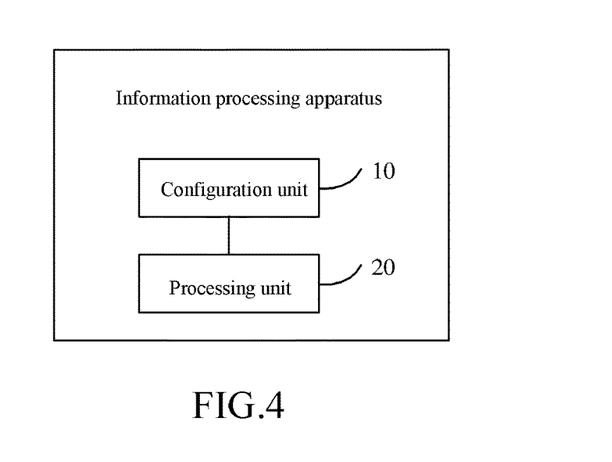
FIG. 4 is a first block diagram illustrating an information processing apparatus according to an embodiment.

FIG. 4 is a first block diagram illustrating an information processing apparatus according to an embodiment. The information processing apparatus is applied to the base station side. Referring to FIG. 4, the apparatus includes a configuration unit 10 and a processing unit 20.

The configuration unit 10 is configured to configure measurement instruction information for cell reselection for the UE; where the UE has at least two identity recognition modules.

The processing unit 20 is configured to send the measurement instruction information to the UE.

The measurement instruction information includes first measurement instruction information, and the first measurement instruction information is configured to instruct the UE to use one of the at least two identity recognition modules to perform cell reselection measurement when the first condition is satisfied.

In some optional implementation manners, the first condition includes:

reference signal receiving power measurement value of N or more of the at least two identity recognition modules is higher than the first threshold value, where N is a positive integer greater than or equal to 1.

In some optional implementation manners, the configuration unit 10 is further configured to:

configure first measurement instruction information for the UE. The first measurement instruction information is configured to instruct the UE to use the identity recognition module with the highest reference signal receiving power measurement value among the at least two identity recognition modules to perform cell reselection measurement when the first condition is satisfied.

In some optional implementation manners, the configuration unit 10 is further configured to:

configure second measurement instruction information for the UE, where the second measurement instruction information is used to indicate the UE that when the first condition is not satisfied or the second condition is satisfied, each identity recognition module in the UE performs cell reselection measurement separately.

In some optional embodiments, the second condition includes:

reference signal receiving power measurement value of M or more identity recognition modules in the at least two identity recognition modules is lower than the second threshold value, where M is a positive integer greater than or equal to 1.

Regarding the apparatuses in the foregoing embodiments, the specific manner in which each module performs the operation has been described in detail in the embodiments of the method, and the detailed description will not be given here.

In practical applications, the specific structures of the configuration unit 10 and the processing unit 20 may be implemented by a Central Processing Unit (CPU), a Micro Controller Unit (MCU), a Digital Signal Processing (DSP), or a Programmable Logic Controller (PLC), etc. in the information processing apparatus or the base station to which the information processing apparatus belongs.

The information processing apparatus described in this embodiment may be installed on the base station side.

Those skilled in the art should understand that the functions of individual processing modules in the information processing apparatus in the embodiments of the present disclosure may be understood by referring to the above-mentioned relevant description of the information processing method applied to the base station side. The individual modules in the information processing apparatus in the embodiments of the present disclosure may be implemented by an analog circuit that implements the functions described in the embodiments of the present disclosure, or may be implemented by running software that implements the functions described in the embodiments of the present disclosure on the terminal.

The information processing apparatus described in the embodiments of the present disclosure can provide a multi-card UE with a cell reselection measurement method. By sending the measurement instruction information of the cell reselection to the UE, the UE is notified to perform different cell reselection measurements according to the actual situation, thereby reducing the power consumption of the multi-card UE due to cell reselection measurement.

Figure 5:
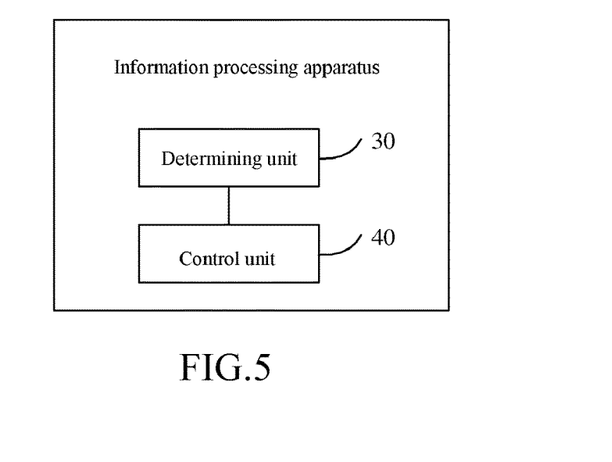
FIG. 5 is a second block diagram of an information processing apparatus according to an embodiment.

FIG. 5 is a second block diagram illustrating an information processing apparatus according to an embodiment. The information processing apparatus is applied to the UE side, and the UE has at least two identity recognition modules. Referring to FIG. 5, the apparatus includes a determining unit 30 and a control unit 40.

The determining unit 30 is configured to receive measurement instruction information for cell reselection configured by the base station for the UE.

The control unit 40 is configured to perform cell reselection measurement according to the measurement instruction information.

The measurement instruction information includes first measurement instruction information, and the first measurement instruction information is configured to instruct the UE to use one of the at least two identity recognition modules to perform cell reselection measurement when the first condition is satisfied.

In some optional embodiments, the control unit 40 is configured to:

when the UE satisfies the first condition, use one of the at least two identity recognition modules to perform cell reselection measurement.

In some optional implementation manners, the first condition includes:

reference signal receiving power measurement values of N or more of the at least two identity recognition modules are higher than the first threshold value, where N is a positive integer greater than or equal to 1.

In some optional implementation manners, the control unit 40 is further configured to:

when the UE satisfies the first condition, determine the identity recognition module with the highest reference signal receiving power measurement value among the at least two identity recognition modules; and use the identity recognition module with the highest reference signal receiving power measurement value to perform cell reselection measurement.

In some optional implementation manners, the control unit 40 is further configured to:

when the first condition is not satisfied or the second condition is satisfied in the UE, control each identity recognition module in the UE to perform cell reselection measurement separately.

In some optional embodiments, the second condition includes:

the reference signal receiving power measurement values of M or more identity recognition modules in the at least two identity recognition modules are lower than the second threshold value, where M is a positive integer greater than or equal to 1.

Regarding the apparatuses in the foregoing embodiment, the specific manner in which each module performs the operation has been described in detail in the embodiments of the method, and the detailed description will not be given here.

In actual applications, the specific structures of the determination unit 30 and the control unit 40 may be implemented by the CPU, MCU, DSP, or PLC in the information processing apparatus or the terminal to which the information processing apparatus belongs.

The information processing apparatus described in this embodiment may be installed on the terminal side.

Those skilled in the art should understand that the functions of each processing module in the information processing apparatus in the embodiments of the present disclosure may be understood by referring to the above-mentioned relevant description of the information processing method applied to the base station side. The individual modules in the embodiments of the present disclosure may be implemented by an analog circuit that implements the functions described in the embodiments of the present disclosure, or may be implemented by running software that implements the functions described in the embodiments of the present disclosure on the terminal.

The information processing apparatus described in the embodiments of the present disclosure enables the multi-card UE to perform different cell reselection measurements according to actual conditions, and reduces the power consumption of the multi-card UE due to the cell reselection measurement.

Figure 6:
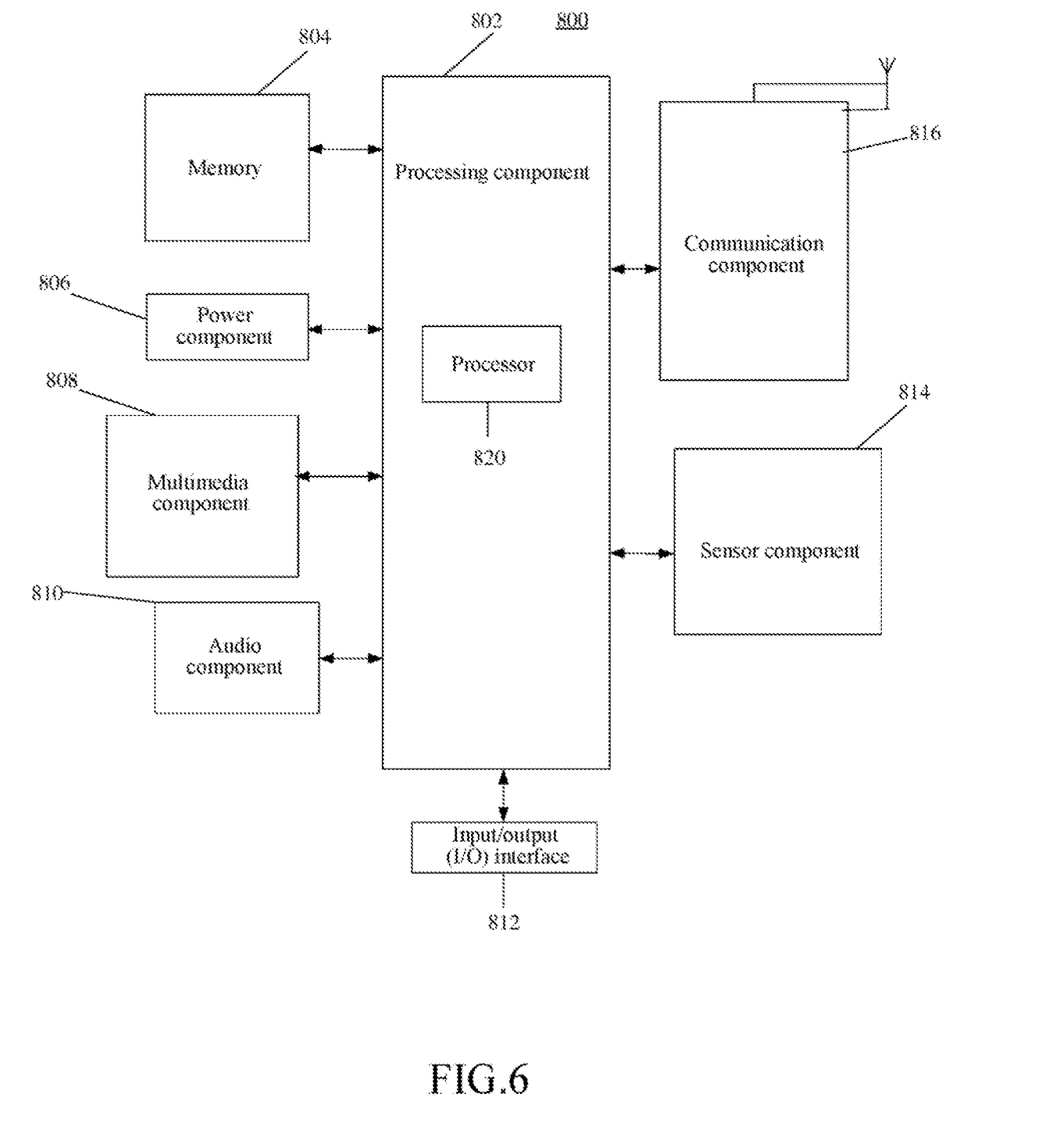
FIG. 6 is a first block diagram illustrating an apparatus for information processing according to an embodiment.

FIG. 6 is a block diagram illustrating an apparatus 800 for implementing information processing according to an embodiment. For example, the apparatus 800 may be a mobile phone, a computer, a digital broadcast terminal, a messaging device, a gaming console, a tablet, a medical device, exercise equipment, a personal digital assistant, and the like Referring to FIG. 6, the apparatus 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the apparatus 800, such as the operations associated with display, telephone calls, data communications, camera operations and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or an optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 may access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra Wide Band (UWB) technology, a Blue Tooth (BT) technology, and other technologies.

In embodiments, the apparatus 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above-described methods.

In embodiments, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a Random Access Memory (RAM), a CD-ROM, a magnetic tape, a floppy disc, an optical data storage device, and the like.

There is provided a computer-readable storage medium, when executable instructions in the storage medium are executed by a processor of a base station, the base station is enabled to execute an information processing method, the method including:
configuring measurement instruction information for cell reselection for a user equipment (UE); where the UE has at least two identity recognition modules; and
sending the measurement instruction information to the UE;
where the measurement instruction information includes:
first measurement instruction information, and the first measurement instruction information is configured to instruct the UE to use one of the at least two identity recognition modules to perform cell reselection measurement when a first condition is satisfied.

In some optional implementation manner, the first condition includes:
reference signal receiving power measurement values of N or more identity recognition modules in the at least two identity recognition modules are higher than a first threshold value, where N is a positive integer greater than or equal to 1.

The first measurement instruction information is further configured to instruct the UE to use the identity recognition module with the highest reference signal receiving power measurement value in the at least two identity recognition modules to perform cell reselection measurement when the first condition is satisfied.

The measurement instruction information further includes second measurement instruction information, and the second measurement instruction information is configured to instruct the UE that each of the identity recognition modules in the UE independently performs cell reselection measurement when the first condition is not satisfied or a second condition is satisfied.

In some optional implementation manner, the second condition includes:
reference signal receiving power measurement values of M or more identity recognition modules in the at least two identity recognition modules are lower than a second threshold value, where M is a positive integer greater than or equal to 1.

Those skilled in the art should understand that the function of each program in the storage medium of the present embodiment can be understood with reference to the relevant description of the information processing method applied to the base station side in the embodiment.

Figure 7:
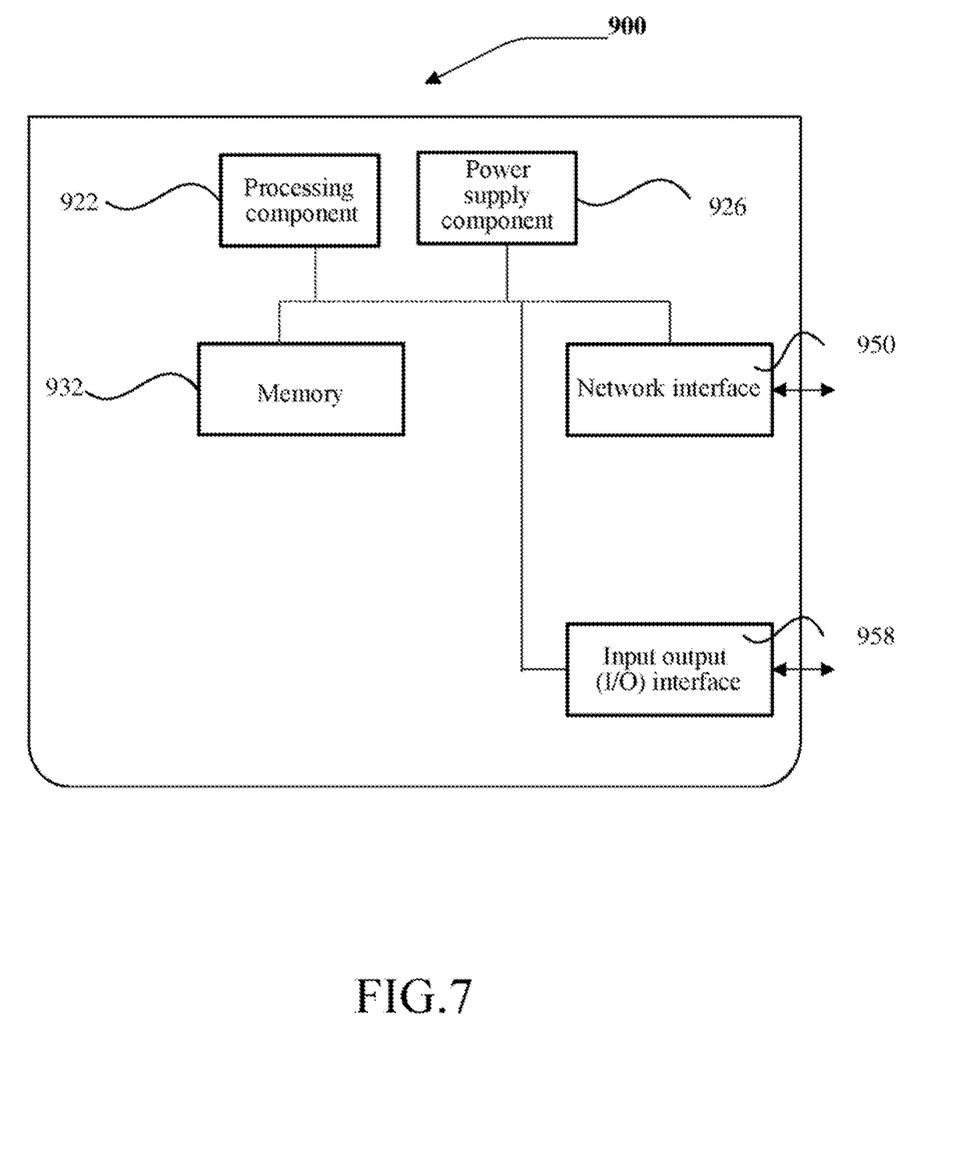
FIG. 7 is a second block diagram illustrating an apparatus for information processing according to an embodiment.

FIG. 7 is a block diagram illustrating an apparatus 900 for information processing according to an embodiment. For example, the apparatus 900 may be provided as a server. With reference to FIG. 7, the apparatus 900 includes a processing component 922, which further includes one or more processors, and a memory resource represented by a memory 932, for storing instructions that can be executed by the processing component 922, such as application programs. The application program stored in the memory 932 may include one or more modules each corresponding to a set of instructions. In addition, the processing component 922 is configured to execute instructions to execute the aforementioned information processing method applied to the base station side.

The apparatus 900 may also include: a power supply component 926 configured to perform power management of the apparatus 900, a wired or wireless network interface 950 configured to connect the apparatus 900 to a network, and an input output (I/O) interface 958. The apparatus 900 may operate based on an operating system stored in the memory 932, such as Windows Server™, Mac OS X™, Unix™, Linux™, FreeBSD™ or the like.

There is provided a computer storage medium. When executable instructions in the storage medium are executed by a processor of a user equipment, the user equipment (UE) can execute an information processing method, the method including:
receiving measurement instruction information for cell reselection configured by a base station for the UE; where the UE has at least two identity recognition modules; and
performing cell reselection measurement according to the measurement instruction information.

As an implementation manner, the executable instructions are used to:
when the UE satisfies the first condition, use one identity recognition module to perform cell reselection measurement.

In some optional implementation manners, the first condition includes:
reference signal receiving power measurement values of N or more of the at least two identity recognition modules are higher than the first threshold value, where N is a positive integer greater than or equal to 1.

As an implementation manner, the executable instructions are used to:
when the UE satisfies the first condition, determine the identity recognition module with the highest reference signal receiving power measurement value among the at least two identity recognition modules; and use the identity recognition module with the highest reference signal receiving power measurement value to perform cell reselection measurement.

As an implementation manner, the executable instructions are used to:

when the UE does not satisfy the first condition or satisfies the second condition, control each identity recognition module in the UE to perform cell reselection measurement separately.

In some optional implementation manners, the second condition includes:

the reference signal receiving power measurement values of M or more identity recognition modules in the at least two identity recognition modules are lower than the second threshold value, where M is a positive integer greater than or equal to 1.

The technical solutions provided by the embodiments of the present disclosure may include the following beneficial effects.

The measurement instruction information for cell reselection is configured for the UE, and the measurement instruction information is sent to the UE, so that the UE performs cell reselection measurement based on the measurement instruction information. Specifically, the first measurement instruction information for cell reselection is configured for the UE, and the first measurement instruction information is configured to instruct the UE to use one of the at least two identity recognition modules to perform cell reselection when the first condition is satisfied. In this way, the base station sets that the UE can select one identity recognition module to perform cell reselection measurement when the first condition is satisfied, which reduces the number of cell reselection measurements of each identity recognition module in a multi-card UE, thereby reducing the power consumed by the multi-card UE due to cell reselection measurements.

The technical solutions described in the embodiments of the present disclosure may be combined arbitrarily if there is no conflict.

Other embodiments of the present disclosure will be apparent to those skilled in the art from consideration of the specification and practice of the disclosure disclosed here. The present disclosure is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

INDUSTRIAL APPLICABILITY

According to the technical solutions of the embodiments of the present disclosure, the base station configures the multi-card UE with measurement instruction information for cell reselection, and sends the measurement instruction information to the multi-card UE, so that the multi-card UE can perform different cell reselection measurements according to the actual situation, thereby saving the power consumed by the multi-card UE due to cell reselection measurement.

What is claimed is:

1. An information processing method, comprising:
configuring measurement instruction information for cell reselection for a user equipment (UE); wherein the UE comprises at least two identity recognition modules; and
sending the measurement instruction information to the UE;
wherein the measurement instruction information comprises: first measurement instruction information, and the first measurement instruction information is configured to instruct the UE to use one of the at least two identity recognition modules to perform cell reselection measurement in response to determining that a first condition is satisfied,
wherein the first condition comprises:
reference signal receiving power measurement values of N or more identity recognition modules in the at least two identity recognition modules are higher than a first threshold value, wherein N is a positive integer greater than or equal to 1.

2. The information processing method according to claim 1, wherein the first measurement instruction information is further configured to instruct the UE to use an identity recognition module with a highest reference signal receiving power measurement value in the at least two identity recognition modules to perform cell reselection measurement in response to determining that the first condition is satisfied.

3. The information processing method according to claim 1, wherein the measurement instruction information further comprises second measurement instruction information, and the second measurement instruction information is configured to instruct the UE that each identity recognition module in the UE independently performs cell reselection measurement in response to determining that the first condition is not satisfied or a second condition is satisfied.

4. The information processing method according to claim 3, wherein the second condition comprises:
reference signal receiving power measurement values of M or more identity recognition modules in the at least two identity recognition modules are lower than a second threshold value, wherein M is a positive integer greater than or equal to 1.

5. An information processing method, comprising:
receiving measurement instruction information for cell reselection configured by a base station for a user equipment (UE) comprising at least two identity recognition modules; wherein the measurement instruction information comprises first measurement instruction information, and the first measurement instruction information is configured to instruct the UE to use one of the at least two identity recognition modules to perform cell reselection measurement in response to determining that a first condition is satisfied; and
performing cell reselection measurement according to the measurement instruction information,
wherein the first condition comprises:
reference signal receiving power measurement values of N or more identity recognition modules in the at least two identity recognition modules are higher than a first threshold value, wherein N is a positive integer greater than or equal to 1.

6. The information processing method according to claim 5, wherein in response to determining that the UE satisfies the first condition, performing cell reselection measurement according to the measurement instruction information comprises:
determining an identity recognition module with a highest reference signal receiving power measurement value in the at least two identity recognition modules; and
using the identity recognition module with the highest reference signal receiving power measurement value to perform cell reselection measurement.

7. The information processing method according to claim 5, wherein the measurement instruction information further comprises second measurement instruction information, and the second measurement instruction information is configured to instruct the UE that each identity recognition module in the UE independently performs cell reselection measurement in response to determining that the first condition is not satisfied or a second condition is satisfied;
wherein performing cell reselection measurement according to the measurement instruction information comprises:
in response to determining that the first condition is not satisfied or the second condition is satisfied, controlling each identity recognition module in the UE to perform cell reselection measurement independently.

8. The information processing method according to claim 7, wherein the second condition comprises:
reference signal receiving power measurement values of M or more identity recognition modules in the at least two identity recognition modules are lower than a second threshold value, wherein M is a positive integer greater than or equal to 1.

9. An information processing apparatus, comprising:
a processor; and
a memory for storing instructions executable by the processor;
wherein when executing the executable instructions, the processor is configured to:
configure measurement instruction information for cell reselection for a user equipment (UE); wherein the UE comprises at least two identity recognition modules; and
send the measurement instruction information to the UE;
wherein the measurement instruction information comprises:
first measurement instruction information, wherein the first measurement instruction information is configured to instruct the UE to use one of the at least two identity recognition modules to perform cell reselection measurement in response to determining that a first condition is satisfied,
wherein the first condition comprises:
reference signal receiving power measurement values of N or more identity recognition modules in the at least two identity recognition modules are higher than a first threshold value, wherein N is a positive integer greater than or equal to 1.

10. The information processing apparatus according to claim 9, wherein the first measurement instruction information is further configured to instruct the UE to use an identity recognition module with a highest reference signal receiving power measurement value in the at least two identity recognition modules to perform cell reselection measurement in response to determining that the first condition is satisfied.

11. The information processing apparatus according to claim 9, wherein the measurement instruction information further comprises second measurement instruction information, and the second measurement instruction information is configured to instruct the UE that each identity recognition module in the UE independently performs cell reselection measurement in response to determining that the first condition is not satisfied or a second condition is satisfied.

12. The information processing apparatus according to claim 11, wherein the second condition comprises:
reference signal receiving power measurement values of M or more identity recognition modules in the at least two identity recognition modules are lower than a second threshold value, wherein M is a positive integer greater than or equal to 1.

13. An information processing apparatus, comprising:
a processor; and
a memory for storing instructions executable by the processor;
wherein when executing the executable instructions, the processor is configured to:
receive measurement instruction information for cell reselection configured by a base station for a user equipment (UE) comprising at least two identity recognition modules; wherein the measurement instruction information comprises first measurement instruction information, and the first measurement instruction information is configured to instruct the UE to use one of the at least two identity recognition modules to perform cell reselection measurement in response to determining a first condition is satisfied; and
perform cell reselection measurement according to the measurement instruction information,
wherein the first condition comprises:
reference signal receiving power measurement values of N or more identity recognition modules in the at least two identity recognition modules are higher than a first threshold value, wherein N is a positive integer greater than or equal to 1.

14. The information processing apparatus according to claim 13, wherein the processor is further configured to: in response to determining that the UE satisfies the first condition, determine an identity recognition module with a highest reference signal receiving power measurement value in the at least two identity recognition modules; and use the identity recognition module with the highest reference signal receiving power measurement value to perform cell reselection measurement.

15. The information processing apparatus according to claim 13, wherein the measurement instruction information further comprises second measurement instruction information, and the second measurement instruction information is configured to instruct the UE that each identity recognition module in the UE independently performs cell reselection measurement in response to determining that the first condition is not satisfied or a second condition is satisfied; and
the processor is further configured to:
in response to determining that the first condition is not satisfied or the second condition is satisfied, instruct each identity recognition module in the UE to perform cell reselection measurement independently.

16. The information processing apparatus according to claim 15, wherein the second condition comprises:
reference signal receiving power measurement values of M or more identity recognition modules in the at least two identity recognition modules are lower than a second threshold value, wherein M is a positive integer greater than or equal to 1.

* * * * *